United States Patent
Anderson et al.

(10) Patent No.: US 12,361,086 B2
(45) Date of Patent: Jul. 15, 2025

(54) METHODS AND SYSTEMS FOR SPATIO-TEMPORAL REGULAR EXPRESSION MATCHING

(71) Applicant: TOYOTA MOTOR ENGINEERING & MANUFACTURING NORTH AMERICA, INC., Plano, TX (US)

(72) Inventors: Jacob W. Anderson, Gilbert, AZ (US); Georgios Fainekos, Novi, MI (US); Bardh Hoxha, Canton, MI (US); Hideki Okamoto, Ann Arbor, MI (US); Danil V. Prokhorov, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/471,829

(22) Filed: Sep. 21, 2023

(65) Prior Publication Data

US 2024/0394318 A1   Nov. 28, 2024

Related U.S. Application Data

(60) Provisional application No. 63/504,574, filed on May 26, 2023.

(51) Int. Cl.
*B60W 60/00* (2020.01)
*G06F 16/2455* (2019.01)
*G06F 16/9537* (2019.01)

(52) U.S. Cl.
CPC ......... *G06F 16/9537* (2019.01); *B60W 60/00* (2020.02); *G06F 16/24568* (2019.01)

(58) Field of Classification Search
CPC .......... G06F 16/9537; G06F 16/24568; B60W 60/00
See application file for complete search history.

(56) References Cited

U.S. PATENT DOCUMENTS 9,269,243 B2   2/2016  Shet
10,133,275 B1 *  11/2018  Kobilarov ......... B60W 60/0016
(Continued)

OTHER PUBLICATIONS

Fischer et al., "Spatio-Temporal Research Data Infrastructure in the Context of Autonomous Driving", Aug. 25, 2020, International Journal of Geo-Information, pp. 1-18 (Year: 2020).*

(Continued)

*Primary Examiner* — Jorge A Casanova
(74) *Attorney, Agent, or Firm* — SHEPPARD, MULLIN, RICHTER & HAMPTON LLP; Daniel N. Yannuzzi

(57) ABSTRACT

Systems and methods are provided that implement spatio-temporal query of perception data streams. A system is distinctly designed to implement efficient and flexible spatio-temporal queries, which conduct pattern matching over perception data streams for automotive applications, particularly autonomous vehicles. The system is also designed to enable the spatio-temporal queries to be expressed in SpREs (Spatial Regular Expressions), which is implemented as a querying language that combines the ease of REs (regular expressions) with the enhanced capabilities of spatial logic. Additionally, a method includes receiving a command associated with a spatio-temporal query, wherein the expression comprises spatial regular expressions (SpREs). Thereafter, performing the spatio-temporal query of a plurality of perception data streams using the SpREs, where the SpREs describe spatio-temporal patterns to be searched within the plurality of perception data streams.

20 Claims, 10 Drawing Sheets

(56) References Cited

U.S. PATENT DOCUMENTS

| | | | | |
|---|---|---|---|---|
| 10,133,752 | B2 | 11/2018 | Begeja | |
| 10,757,369 | B1* | 8/2020 | Mukhopadhyay | G06T 7/194 |
| 11,675,816 | B1* | 6/2023 | Chandrasekharan | G06F 11/3082 707/737 |
| 11,934,417 | B2* | 3/2024 | Lu | H04L 67/75 |
| 2010/0070527 | A1 | 3/2010 | Chen | |
| 2013/0339371 | A1* | 12/2013 | Hayashi | G06F 16/2458 707/743 |
| 2015/0339570 | A1* | 11/2015 | Scheffler | G06N 3/04 706/27 |
| 2016/0034323 | A1* | 2/2016 | Hampapur | G06F 16/2477 719/318 |
| 2016/0034824 | A1* | 2/2016 | Dong | G06F 16/2237 706/12 |
| 2020/0226467 | A1 | 7/2020 | Fainekos | |
| 2021/0157858 | A1* | 5/2021 | Stevens | G06F 40/279 |
| 2022/0172606 | A1* | 6/2022 | Pandya | G08G 1/0129 |
| 2022/0366272 | A1* | 11/2022 | Sato | G06N 20/00 |
| 2023/0159054 | A1* | 5/2023 | Jespersen | B60W 60/0013 701/23 |
| 2023/0242142 | A1* | 8/2023 | Zhang | B60W 60/001 701/23 |

OTHER PUBLICATIONS

Dokhanchi et al., "Evaluating Perception Systems for Autonomous Vehicles Using Quality Temporal Logic," 18th International Conference on Runtime Verification, Nov. 2018, pp. 409-416 (https://doi.org/10.1007/978-3-030-03769-7_23).

Hekmatnejad et al., "Formalizing and Evaluating Requirements of Perception Systems for Automated Vehicles using Spatio-Temporal Perception Logic," arXiv:2206.14372v1 [cs.RO], Jun. 29, 2022, 27 pages (https://doi.org/10.48550/arXiv.2206.14372).

Kim et al., "Querying Labelled Data with Scenario Programs for Sim-to-Real Validation," 2022 ACM/IEEE 13th International Conference on Cyber-Physical Systems (ICCPS), May 2022, 12 pages (https://doi.org/10.1109/ICCPS54341.2022.00010).

Mell et al., "Synthesizing Video Trajectory Queries," 35th Conference on Neural Information Processing Systems (NeurIPS 2021), Dec. 2021, 29 pages (https://openreview.net/pdf?id=HyTleooyV2H).

Yadav et al., "VidCEP: Complex Event Processing Framework to Detect Spatiotemporal Patterns in Video Streams," 2019 IEEE International Conference on Big Data (Big Data), Dec. 2019, pp. 2513-2522 (https://doi.org/10.1109/BigData47090.2019.9006018).

* cited by examiner

METHODS AND SYSTEMS FOR SPATIO-TEMPORAL REGULAR EXPRESSION MATCHING

REFERENCE TO RELATED APPLICATION

The present application claims priority to provisional application U.S. Patent Application No. 63/504,574, filed May 26, 2023 and titled "SYSTEMS AND METHODS FOR SPATIO-TEMPORAL REGULAR EXPRESSION MATCHING," which is incorporated herein by reference in its entirety.

TECHNICAL FIELD

The present disclosure relates generally to systems and methods for analyzing data related to spatial perception for automotive applications. Specifically, some implementations relate to performing pattern matching queries of spatial perception datasets for autonomous vehicles.

DESCRIPTION OF RELATED ART

Spatial perception generally refers to the ability to perceive and understand the spatial relationships between objects, people, and the environment. Particularly in the realm of automotive applications, specifically autonomous vehicles, spatial perception involves a vehicle's ability to perceive and understand its surroundings in the three-dimensional (3D) space. It often relies on a combination of sensors, such as cameras, LiDAR (Light Detection and Ranging), radar, and GPS, to gather information about the vehicle's surrounding environment. By analyzing the sensor data, the autonomous vehicle can create a detailed representation of space with respect to its environment, and the surrounding objects within that space, including other vehicles, pedestrians, road signs, and obstacles.

Spatial perception enables the autonomous vehicle to accurately perceive distances, sizes, positions, and shapes of objects, as well as their motion and trajectory. This information is crucial for the vehicle to make decisions and navigate safely. By continuously updating and interpreting the spatial data, the autonomous vehicle can plan its path, avoid collisions, and interact with the environment in a manner that mimics human spatial perception.

Developing robust spatial perception capabilities is a key challenge in autonomous vehicle technology, as it requires advanced sensor fusion algorithms, machine learning, and computer vision techniques to process and interpret the vast amount of sensor data in real-time.

BRIEF SUMMARY OF THE DISCLOSURE

In accordance with some embodiments a method for implementing spatio-temporal queries of perception data streams (e.g., relating to autonomous vehicle operation) is described. The method comprises receiving a command associated with a spatio-temporal query, wherein the spatio-temporal query comprises spatial regular expressions (SpREs). Further, the method performs the spatio-temporal query of a plurality of perception data streams using the SpREs. The SpREs describe spatio-temporal patterns to be searched within the plurality of perception data streams.

In accordance with some embodiments a vehicle implementing spatio-temporal queries of perception data streams is described. The vehicle includes sensors capturing a plurality of perception data. The plurality of perception data is associated with a driving environment of the vehicle. The vehicle also includes a controller performing spatio-temporal queries of the plurality of perception data to determine a presence of a pattern within the driving environment of the vehicle. The spatio-temporal query monitor executes spatio-temporal searches within the plurality of perception data and returns instances of perception data matching the pattern. The controller also executing an autonomous control of the vehicle based on the spatio-temporal query of the searched pattern, wherein the autonomous control is associated with the driving environment.

In accordance with some embodiments a computer system for implementing spatio-temporal queries of perception data streams is described. The computer system is programmed with instructions to receive a command associated with a spatio-temporal query. The spatio-temporal query comprises spatial regular expressions (SpREs). Further, the computer system performs the spatio-temporal query of a plurality of perception data streams using the SpREs. The SpREs describe spatio-temporal patterns to be searched within the plurality of perception data streams.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Autonomous systems, such as autonomous vehicles, utilize spatial perception in order to execute various autonomous tasks that require spatial awareness and coordination. Many autonomous vehicles implement perception modules therein, which require a significant data collection effort for training, as well as a significant verification and validation effort to ensure robust operation in diverse environments. Thus, a pervasive challenge related to spatial perception in automotive applications is collecting and analyzing data for specific scenarios of interest. Instrumented vehicles (e.g., autonomous vehicles and non-autonomous vehicles) collect vast amounts of perception data, however all of the data collected is not necessarily guaranteed to be useful to other applications such as machine learning. Another major challenge is cross-domain generalization to ensure that a system validated and tested in one specific environment can also operate as intended under different operating conditions. In either case (e.g., training or testing), there is a plethora of advantages in spatial perception by realizing the capability to effectively query perception data streams in order to discover specific scenarios of relevance. However, current techniques do not support the computational complexity required to query perception datasets (e.g., spatial pattern matching) which limits the usefulness of information that can be gleaned from perceptual data. The disclosed embodiments provide systems and methods that implement spatio-temporal query of perception data streams (e.g., relating to autonomous vehicle operation) to address the aforementioned challenges.

As disclosed herein, Spatial Regular Expressions (SpREs) are implemented which support spatio-temporal querying for efficient and flexible querying of large perception datasets. Generally, SpREs combine Regular Expressions (REs) with a modal logic of topology. Thus, by leveraging SpREs, the disclosed spatio-temporal query provides increased ease of use (e.g., based on REs) while enabling reasoning over topological relations. Additionally, spatio-temporal queries can be efficiently solved due to the reduction of the pattern matching problem, which in turn allows well-established libraries to be employed in a manner that provides fast processing. Furthermore, modular design and compatibility with conventional programming applications (e.g., Linux, Bash, and batch scripts) support versatility and expandability of the disclosed embodiments, for example in verification and validation processes.

Figure 1:
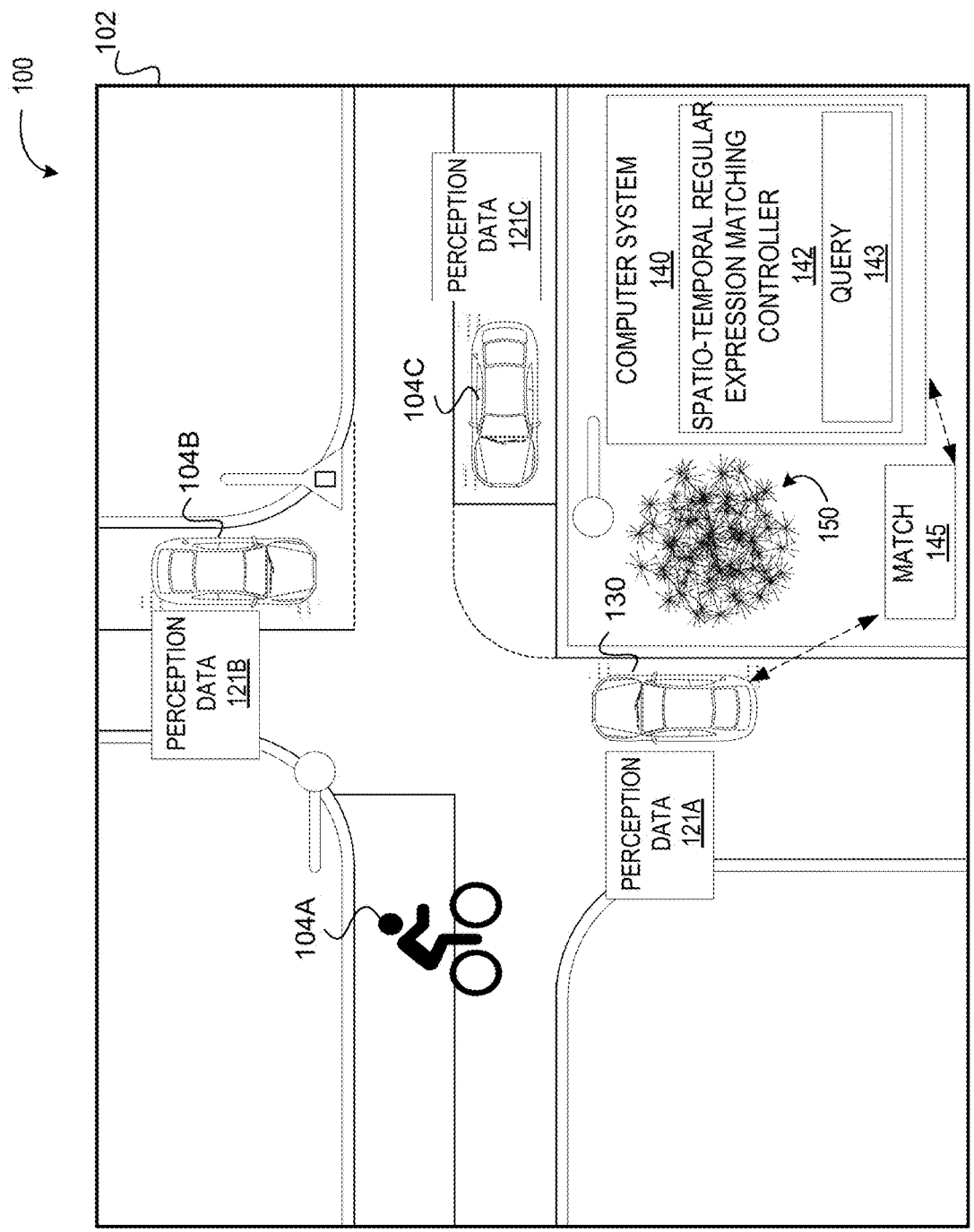
FIG. 1 depicts an example illustration of a vehicle environment implementing a spatio-temporal regular expression matching (STREM) system performing a spatio-temporal query of perception data streams, according to one embodiment.

FIG. 1 is a schematic diagram of an example environment 102 in which the disclosed STREM (spatio-temporal regular expression matcher) system 100 is implemented. The STREM system 100 is distinctly designed to implement efficient and flexible spatio-temporal queries, which conduct pattern matching over perception data streams (e.g., perception data 121A-121C) for automotive applications, particularly autonomous vehicles. Furthermore, the STREM system 100 is designed to enable these spatio-temporal queries to be expressed in SpREs (Spatial Regular Expressions), which is implemented as a querying language that combines the ease of REs (regular expressions) with the enhanced capabilities of spatial logic.

Autonomous vehicle datasets are becoming more accessible due to the increase in autonomous vehicle operations. These datasets include information such as vehicle data, videos, images, object annotations, location, status codes, thermal readings, and LiDAR. Early approaches in querying these datasets from autonomous vehicles, such as video data streams, relied on formulating the data to a specific contextualized database schema representation to leverage the database search engine capabilities in resolving lookups for videos of interest. With current trends showcasing large volume datasets from autonomous vehicles being generated for various applications, conventional database approaches inhabit the labor intensive task of designing an efficient representation of the datasets while also limiting the functionality of the data itself. Furthermore, querying the data is not necessarily "user-friendly" as the selected framework is coupled to the search engine. There have been attempts to resolve this issue by using natural language and interactive graphical interfaces, however, the approach still relies directly on building up a properly indexed database before basic searching capabilities are provided.

Additionally in the realm of querying of data, regular expressions are a widespread and powerful pattern-matching technique used to manipulate text based on specific patterns or sequences of characters. For instance, REs can be used to formulate pattern matching-based expressions for searching and recognizing patterns from a specified input. The application of REs has expanded to many domains such as compilers, editors, search engines, and more. From its formulation, popular tools such as grep and agrep leverage REs to perform pattern matching capabilities over strings. There are some approaches that use RE-based querying languages to provide powerful pattern matching of data from autonomous vehicles. However, these approaches focus primarily on the trajectory aspects of the data streams and do not generally have the complexity or sophistication to support spatially-aware searching, for instance over data sets from autonomous vehicles that typically include perceptual representations of information. The STREM system 100, disclosed herein, is distinctly designed to provide efficient and accurate searching over large data streams, such as autonomous vehicle data sets, by leveraging a RE-based query language and effective searching.

Accordingly, the example of FIG. 1 illustrates a STREM system 100 that has the capability to conduct fast and accurate searching of large datasets, such as autonomous vehicle data streams. In an embodiment, at least vehicle 130 can be an autonomous vehicle. As used herein, "autonomous vehicle" means a vehicle that is configured to operate in an autonomous operational mode. "Autonomous operational mode" means that one or more computing systems of the vehicle 130 are used to navigate and/or maneuver the vehicle along a travel route with a level of input from a human driver which varies with the operational mode. As such, vehicle 130 can have a plurality of autonomous operational modes, with a varied level of automated response. In some embodiments, the vehicle 130 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 130, responses to disclose spatio-temporal queries can be highly, or fully, automated. In some embodiments, the vehicle 130 has an automated driving system which includes the various components (e.g., electronics, machinery, etc.) for implementing the perception, decision making, and controls necessary for autonomous operation (e.g., handling of the vehicle, destination, and awareness of surroundings). For example, the STREM controller 142 can be configured to communicate controls so as to operate the vehicle 130 autonomously and safely. For example, after the STREM controller 142 generates an autonomous control, the vehicle 130, operating as an autonomous vehicle, can automatically perform the necessary adjustments (e.g., lane change) without any human driver interaction. Accordingly, vehicle 130 can operate with respect to computer-controlled safety commands, or controls (based on spatio-temporal queries) in a fully autonomous manner.

Alternatively, or in addition to the above-described modes, vehicle 130 can have one or more semi-autonomous operational modes. "Semi-autonomous operational mode" means that a portion of the navigation and/or maneuvering of the vehicle 130 along a travel route is performed by one or more computing systems, and a portion of the navigation and/or maneuvering of the vehicle 130 along a travel route is performed by a human driver. One example of a semi-autonomous operational mode is when an adaptive cruise control system is activated. In such case, the speed of a vehicle 130 can be automatically adjusted to maintain a safe distance from a vehicle ahead based on data received from on-board sensors, but the vehicle 130 is otherwise operated manually by a human driver. Upon receiving a driver input to alter the speed of the vehicle (e.g., by depressing the brake pedal to reduce the speed of the vehicle), the adaptive cruise control system is deactivated, and the speed of the vehicle is reduced. Thus, with vehicle 130 operating as a semi-autonomous vehicle, the response to a spatio-temporal query can be partially automated. Alternatively, the vehicle 130 may notify a driver that driver input is necessary in response to a spatio-temporal query.

Additionally, FIG. 1 illustrates that the STREM system 100 has the capability to conduct spatio-temporal queries over perception data streams 121A-121C, which may be obtained as autonomous datasets or from non-autonomous vehicles. In the example of FIG. 1, the plurality of vehicles on the roadway can be sensor-rich vehicles (SRVs) that are equipped with vehicles sensors, described herein as ranging sensors (e.g., cameras, LIDAR, radar, ultrasonic sensors) and, in some cases, advanced computational resources. Particularly in the example of FIG. 1, vehicles 130, 104B, and 104C are implemented as SRVs. Accordingly, as SRVs, vehicles 130, 104B, and 104C are enabled to utilize these advances sensors to sense various conditions on the roadway, and obtain perception data streams 121A-121C that are pertinent to the driving environment 102, for instance capturing video (e.g., camera) of a roadway to detect objects, as well as the spatial and temporal relationships between the objects within the environment. Perception data 121A-121C can include but is not limited to: vehicle identifiers; the presence of other vehicles; vehicle position; vehicle speed; vehicle movement; vehicle motion direction; road data; lane data; vehicle acceleration; other static and dynamic objects; image data; planned route data, generated HD local map, processed perception data, and the like. Additionally, the vehicles 104B, 104C, and 130 can have sensor capabilities that are associated with legacy vehicles (LVs), having sensors that are capable of sensing and communicating more basic types of vehicle data, such as vehicle identifiers, vehicle location, vehicle speed, vehicle acceleration, and the like. For example, the vehicles 104B, 104C, and 130 can include Global Positioning System (GPS) sensors, which can provide the basic location, velocity, and acceleration of the vehicle. Also, perception data streams can be communicated from other types of online streaming sources and/or elements having sensor capabilities (e.g., enabling the collection and communication of perceptive data), such as robotic devices, unmanned ariel vehicles (UAV), and advanced driver assistance systems (ADAS), sensor instrumented buildings, and roads. Accordingly, the disclosed STREM system and functions can also realize searches for spatio-temporal patterns in data that is collected from a plethora of sensor-rich environments, such as warehouses, hospitals, road intersections, and the like.

According to the embodiments, perception data streams 121A-121C obtained by vehicles 104C, 104B, and 130 is annotation data (i.e., bounding box information), which allows the data streams to then be queried upon to search for interesting cases such as occlusion of detections. An example of annotated data from a perception data stream can include each object has some attributes along with some Bounding Box (BB) data. Depending on the application, the object identifiers of annotated data may be unique across the data stream, unique only in each frame, or unique for each frame for each class of objects. In some cases, each object in a perception data stream may be annotated with additional data (e.g., camera ID, lidar point cloud, etc.)

In an operation example, vehicles 130, 104B, and 104C can all be actively collecting perception data streams 121A-121C related to specific scenarios of interests. However, pattern matching on perception data streams typically requires more complex computational analysis than standard string (e.g., text) pattern matching, as spatial and temporal relationships are considered for perception data. As described in detail herein, the STREM system 100 is distinctly designed to enable spatio-temporal queries, which are capable of considering the perception of space and time that is contextualized by perception data, in order to detect pattern matches within the perception data streams. Accordingly, the spatio-temporal regular expression matching techniques disclosed herein can be applied to the perception data streams 121A-121C obtained from each of the vehicles 130, 104B, and 104C in order to perform various automotive applications, for instance related to training and controlling autonomous vehicles.

One example of an automotive application implemented by the disclosed STREM system 100 includes an offline database search. In an offline data search application, the disclosed spatio-temporal queries can be employed to find interesting scenarios from the perception data 121A-121C collected from the vehicles 130, 104B, and 104C, (autonomous or non-autonomous) which is archived and stored offline in a database in order to test autonomous vehicle software in simulation or in a real-world deployment. Another example of an automotive application for the STREM system 100 can be described as an "online" application of the disclosed embodiments for autonomous vehicles (e.g., implemented while the vehicle is in operation). While an autonomous vehicle, such as vehicle 130, is in operation, spatio-temporal queries can be employed to describe specific scenarios that ultimately govern the control of autonomous vehicle in the specific scenario. For instance, a spatio-temporal query can be employed that specifies a specific scenario of detecting a firetruck in the opposite direction, specifically where the firetruck is stopped. In the case when there are frames of a video data stream (e.g., perception data) from vehicle 130 that successfully match this scenario (based on the disclosed techniques of pattern matching searches over perception data) detecting a stopped firetruck in a lane of the opposite-direction, then an autonomous control action can be triggered that enables the vehicle 130 to continue driving. Alternatively, a different spatio-temporal query can be employed which specifies a scenario of detecting a firetruck in the opposite direction, however the firetruck is in motion. In this case, frames of the vehicle's 130 video data stream match this query, when a moving firetruck in a lane of the opposite-direction is detected. A different autonomous control action can be triggered in response to this pattern matching within the perception data stream 121A-121C, which executes an autonomous maneuver for the vehicle 130 that automatically guides it to the side of the road (e.g., avoiding a potential collision with the oncoming firetruck).

The example of FIG. 1 illustrates a diagnostics-based automotive application (e.g., online application) of the disclosed STREM system 100. FIG. 1 depicts that a spatio-temporal query 143 can be run by a STREM controller 142 while the autonomous vehicle 130 operates, in order to detect online issues with its perception system and/or sensors. For example, the spatio-temporal query 143 could be expressed to search for a scenario where a bicyclist is present, such as the bicyclists 104A. Which could be used for autonomous vehicle diagnostics, to further detect instances where the perception system of vehicle 130 detects bicyclists 104A cannot accurately conclude if the object in the environment should be classified as a bicyclist (e.g., person riding a bicycle in a lane of the road) or a pedestrian with a bicycle (e.g., person walking with a bicycle on the sidewalk), which could impact the overall performance and safe operation of the autonomous vehicle 130.

In FIG. 1, the example operating environment 102 includes a vehicle 130, a bicyclist 104A (e.g., person riding a bicycle) and vehicles 104B and 104C are sharing the roadway at a four-way intersection. Although the example of FIG. 1 describes vehicles, it should be appreciated that the spatio-temporal regular expression pattern matching techniques, as disclosed herein, may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types and systems as well, such as robotic devices, unmanned ariel vehicles (UAV), and advanced driver assistance systems (ADAS).

In the example of FIG. 1, the vehicle 130 in which embodiments of the disclosed technology may be implemented is illustrated. Although the example described with reference to FIG. 1 is a type of autonomous vehicle, the systems and methods described herein can be implemented in other types of vehicles including semi-autonomous vehicles, vehicles with automatic controls (e.g., dynamic cruise control), or other vehicles. Also, the example vehicle 130 described with reference to FIG. 1 maybe a type of hybrid electric vehicle (HEV). However, this is not intended to be limiting, and the disclosed embodiments can be implemented in other types of vehicles including gasoline-or diesel-powered vehicles, fuel-cell vehicles, electric vehicles, or other vehicles.

In an embodiment, various entities namely the autonomous vehicle 130, SRV vehicles 104B, 104C, and computer system 140, are configured to implement various aspects of the STREM system 100, for instance collecting, querying, analyzing perception data streams 121A-121C and executing spatio-temporal regular expression matching. Particularly for the autonomous diagnostics application, the computer system 140 is configured to including a STREM controller 142 to perform spatio-temporal queries of perception data streams 121A-121C (where the queries are expressed as SpREs) to detect pattern matches within the perception data streams 121A-121C as part of an online diagnostics process for vehicle 130. The autonomous diagnostics functions may also be carried out using the computer system 140. In the example of FIG. 1, the computer system 140 is depicted as a server, namely an edge server, within a vehicular network 150 (e.g., V2C, V2V, V2X, V2I, etc.) that supports communication between the other communicatively connected entities within the vicinity. Thus, the vehicular network 150 allows the vehicles 130, 104B, and 104C to function as "connected vehicles" being commutatively to each other, computer system 140, as well as other edge devices, other vehicles, and/or a cloud server through V2X communication comprising V2I, V2C, C2V and/or V2V communications. For example, perceptions data streams generated by vehicles 130, 104B, and 104C can be communicated to computer system 140 via vehicular network 150 for running spatio-temporal queries at the server-end. As seen in FIG. 1, the computer system 140 is configured to include a STREM controller 142 configured to perform the spatio-temporal regular expression matching functions and capabilities described herein. For example, the STREM controller 142 is implemented having substantially similar architectural framework and functionality to the system described in greater detail in reference to FIG. 2-FIG. 4. For purposes of brevity, the specific structural configuration, and detailed functions of the STREM controller 142 are not described again in reference to FIG. 1.

FIG. 1 also illustrates that the computer system 140 is also configured for executing and defining spatio-temporal queries over the perception data streams 121A-121C of vehicles 130, 104B, and 104C, shown as query 143. In some embodiments, the computer system 140 stores the perception data streams 121A-121C in local (or remote) databases, repositories, or other storage systems in a manner that enables queries. According to the embodiments, the spatio-temporal query 143 can be expressed, or otherwise entered, as a SpRE. In other words, to search over perception data streams using pattern-based semantics with spatial components, the disclosed embodiments employ SpRE as a distinct querying language designed from the composition of REs and further can be leveraged for spatial logic. In accordance with the embodiments, a first component of the SpRE syntax is based on REs, where the major RE operations are supported including Kleene-star, concatenation, and alternation. Furthermore, a second component of the SpRE syntax is an augment of a spatial logic, such as the S4u logic, in a manner that supports universal modalities, negation, conjunction, and disjunction in order to achieve pattern matching spatially.

For example, the computer system 140 might include one or more processors, controllers, control modules, or other processing devices, where the STREM controller 142 is implemented as hardware processor(s). Alternatively, aspects of the STREM controller 142 and/or the spatio-temporal query 143 may be implemented as software on the computer system 140, such as instructions, machine-readable code, or computer program components. It should also be appreciated upon studying the present disclosure that in one or more embodiments the functions or elements of computer system 140 (including the STREM controller 142 and the spatio-temporal query 143) may reside on board a vehicle, such as autonomous vehicle 130. For example, all or part of computer system 140 may reside within vehicle 130 and their functionalities may be performed thereby.

In an operational example, the spatio-temporal query 143 can be entered and executed on the computer system 140, where the spatio-temporal query 143 is defined to search for a specific pattern, namely the presence of a bicyclist in the driving environment, within the perception data streams 121A-121C generated by vehicles 130, 104B, and 104C. For instance, a query can be entered into a user interface, such as a Command-Line Interface (CLI) tool, that is implemented by the computer system 140. The spatio-temporal query 143 can be entered as a command invocation and executed by the STREM controller 142 to execute a search the data streams with the query from the front camera sensor channels of the data streams. In response to running the spatio-temporal query 143, the STREM controller 142 can return the frames that include a successful match to the queried pattern/object. In some cases, the results of the spatio-temporal query 143 can be exported (e.g., using an additional export-images option) for additional analysis. Particularly, for the autonomous vehicle diagnostics example in FIG. 1, video streams generated by the sensors (e.g., camera) of vehicles 130, 104B, 104C will include some frames that capture the bicyclist 104A that is also at the intersection (approximately at the same time). Accordingly, the spatio-temporal query 143 will search over the perception data streams 121A-121C and determine that there are frames (e.g., a sequence set of frames) within the data stream that match the pattern/object of a bicyclist (specified by the query). In an embodiment, the STREM controller 142 can export the frames of the video streams that capture the presence of the bicyclist 104A in the driving environment 102 into an autonomous diagnostics application (running on computer device 140), which can further determine whether the perception systems of vehicle 130 is accurately analyzing data. As an example, diagnostics can use the spatial logic and querying capabilities of the STREM system 100 in order to ultimately test whether the autonomous vehicle 130 is correctly identifying that the bicyclist 104A captured by its sensors is actually a person riding a bicycle as opposed to a pedestrian in order to apply the appropriately corresponding autonomous controls that treat the bicyclist 104A as a vehicle.

Figure 2:
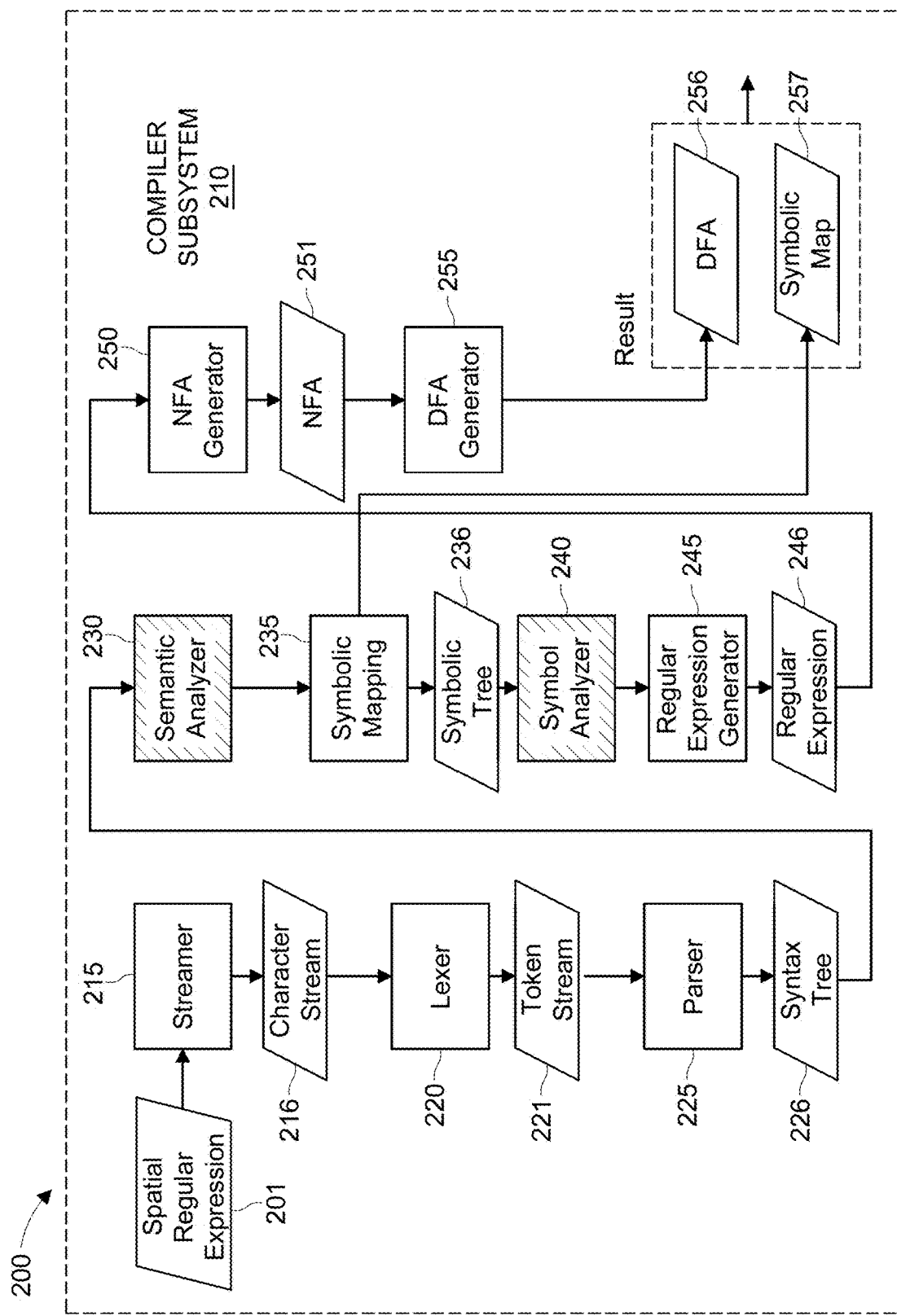
FIG. 2 depicts an example architectural framework for a compiler subsystem of the STREM system shown in FIG. 1, according to one embodiment.
Figure 3:
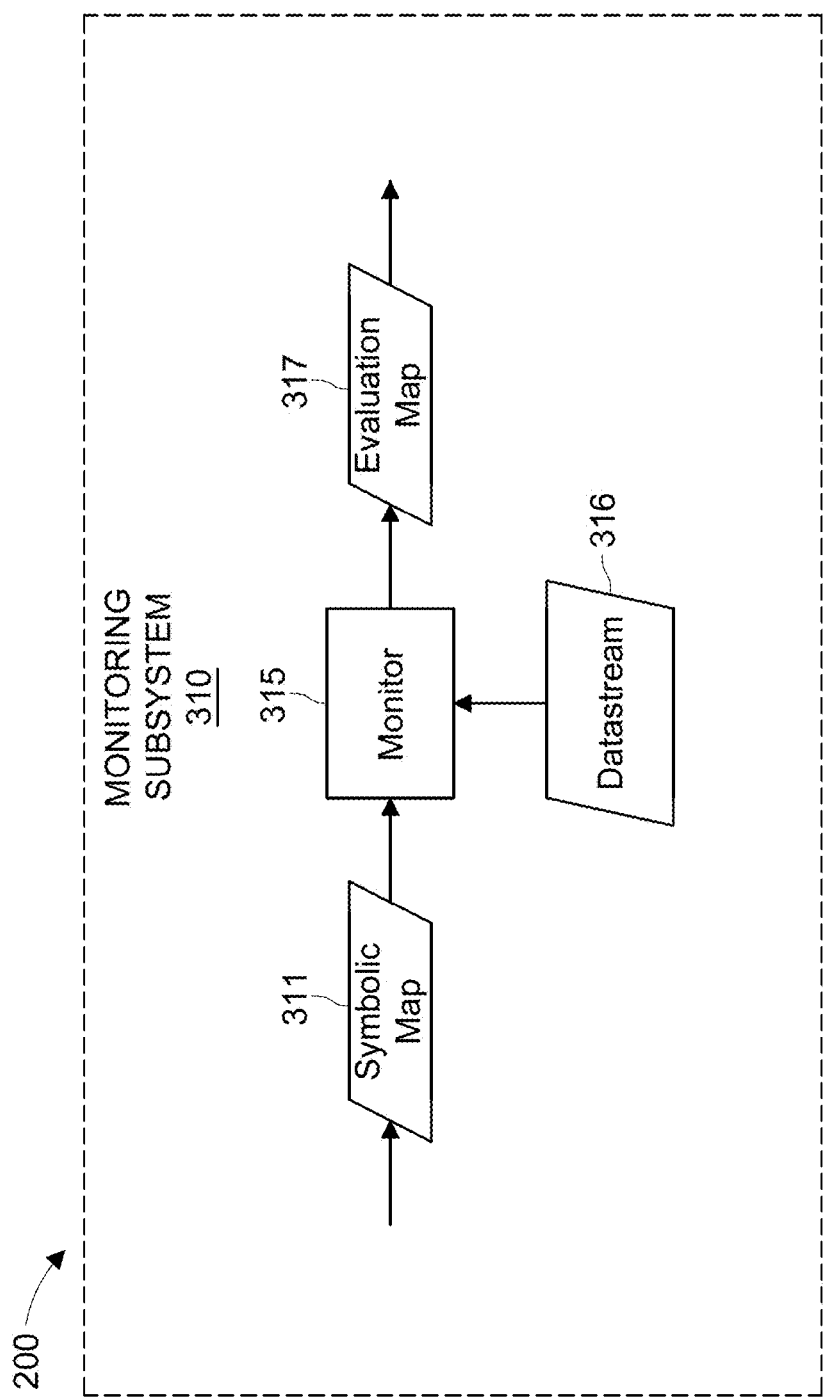
FIG. 3 depicts an example architectural framework for a monitoring subsystem of the STREM system shown in FIG. 1, according to one embodiment.
Figure 4:
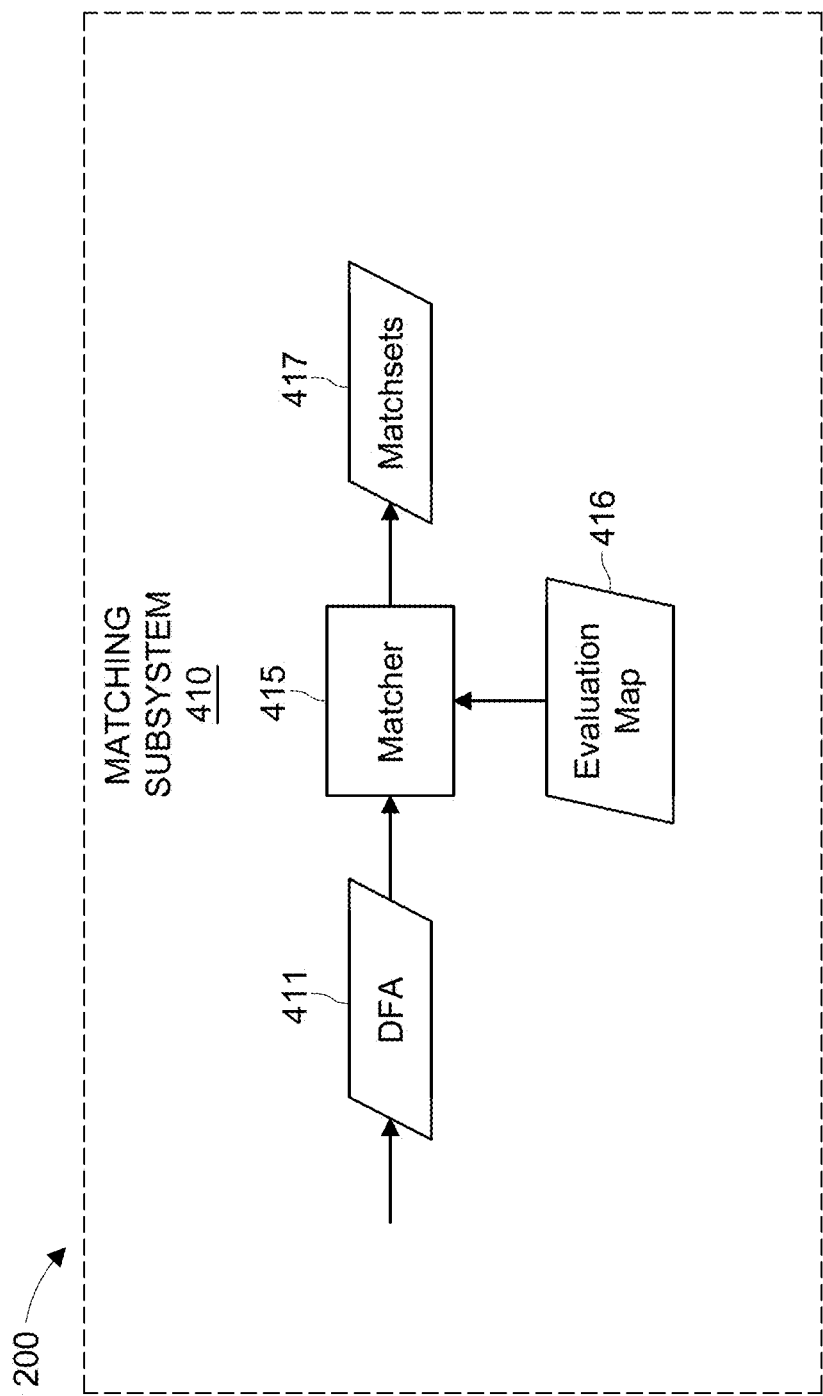
FIG. 4 depicts an example architectural framework for a matching subsystem of the STREM system shown in FIG. 1, according to one embodiment.

FIG. 2-FIG. 4 depict conceptual diagrams of subsystems and/or elements that can be included in an example architectural framework for the STREM system 200. As disclosed herein, the STREM system 200 can be utilized for analyzing perception data in automotive applications, such as an autonomous vehicle (shown in FIG. 1). The STREM system 200 is configured to perform efficient spatio-temporal querying of perception datasets (e.g., video data), which involves searching through the perception datasets to accurately identify pattern matches. The STREM system 200 is designed to be modular, and FIG. 2-FIG. 4 each depict a respective core subsystem of the system's 200 architectural framework that can be implemented as a combination of various hardware and/or software elements that work together collectively to execute the disclosed capabilities of the STREM system 200. In an example, the architectural framework of the STREM system 200 can include three key subsystems, including: (i) a complier subsystem 210 (shown in FIG. 2), which accepts a SpRE and constructs the necessary Intermediate Representations (IRs) depended on by the remaining subsystems; (ii) monitoring subsystem 300 (shown in FIG. 3), which supports the evaluation of perception data (e.g., a frame) against a spatial logic and generates an evaluation map; and (iii) matching subsystem 400 (shown in FIG. 4) accepting the evaluation map and capturing patten matches. The modularity of the STREM system's 200 configuration provides several advantages, such as allowing for seamless integration of the system's 200 core framework into other tools (e.g., without needing to manage the interface).

Referring back to FIG. 2, an example configuration for the compiler subsystem 210 is depicted. The compiler subsystem 210 is configured to accept a SpRE and, from it, generate the corresponding (IR) necessary to perform monitoring (e.g., executed by the monitoring subsystem 300) and matching (e.g., executed by the matching subsystem 400). As seen in FIG. 2, the compiler subsystem 210 has several internal components, including: streamer 215; lexer 220; parser 225; analyzer 230; symbolic mapping 235; symbolic analyzer 240; regular expression generator 245; NFA generator 250; and DFA generator 255.

The compiler subsystem 210 is shown as receiving a SpRE 201 as input. In particular, the SpRE 201 input is received by the streamer 215. The streamer 215 and lexer 220 can be configured to read the input, namely the SpRE 201, and produce a stream of tokens. For example, the streamer 215 and lexer 220 can perform lexical analysis (e.g., tokenization), where the streamer 215 initially reading characters from the SpRE 201 producing a character stream 216, which is input into the lexer 220. The lexer 220 is configured to converting characters from the character stream 215 into a sequence of tokens, which is output as token stream 221. The resulting token stream 221 is passed to the parser 225.

The parser 225 is configured to perform syntactic analysis (or parsing), analyzing the stream of tokens that are produced by the streamer 215 and lexer 220. For example, the parser 225 can analyze the syntactic structure of the token stream 221 and outputs the syntax tree 226, which is a hierarchal structure showing the syntactic relationships between different tokens and expressions. The parser 225 passes the syntax tree 226 to the semantic analyzer 230 for further analysis and processing.

The semantic analyzer 230 is configured to check code for various types of semantic errors that cannot be detected during lexical and syntactic analysis, ensuring the correctness. In the example of FIG. 2, the semantic analyzer 230 can receive the syntax tree 226 and performs analysis which ensures that the code adheres to semantic rules and validates correctness of the program. The semantic analyzer 230 can output the IR which aids in subsequent phases in compiling, such as optimization and code generation.

According to the embodiments, the symbolic mapping 235 is configured to perform a key step of the compilation process and, in turn, provides a key output which be later used in the functional pipeline of the STREM system 200. The symbolic mapping 235 is designed for generating a list of corresponding symbols associated with the sub-components of the SpRE 201. Particularly, FIG. 2 illustrates that the symbolic mapping 235 ultimately outputs the symbolic map 257, which serves as an output from the compiler subsystem 210 that is passed to other subsystems of the STREM system 200.

The symbol analyzer 240 is configured to perform analysis that ensures that the code's symbols are correctly defined and used, facilitating proper compilation and generation of executable code. In the example of FIG. 2, the symbol analyzer 240 receives the symbolic tree 236 and provides sanity checks on the generated symbols.

The regular expression generator 245 is depicted as performing the next stage in the compilation process executed by the compiler subsystem 210. According to the embodiments, the regular expression generator 245 is configured to generate an equivalent RE based on the symbolically representative SpRE 201 that was provided. In other words, the regular expression generator 245 has the capability to ultimately generate a traditional RE that is derived from the SpRE 201. Thus, FIG. 2 illustrates a regular expression 246 as output from the regular expression generator 245. Then, the regular expression 246 is input into the NFA generator 250.

The NFA (Non-Deterministic Finite Automaton) generator 250 and the DFA (Deterministic Finite Automaton) generator 255 are configured for analyzing the generated RE 246 and outputting a proper DFA 256, which is subsequently used during the matching phase implemented by the matching subsystem (shown in FIG. 4) of the STREM system 200. The NFA generator 250 is configured as a computational model that recognizes patterns (or regular expressions) within a given input in a manner that allows for non-determinism in its state transitions. FIG. 2 shows the NFA generator 250 receiving the regular expression 246, and outputting the NFA 251 which is passed to the DFA generator 255.

Generally, to convert a NFA into a DFA, various algorithms such as the subset construction algorithm can be employed. The DFA generator 255 is configured with such algorithms, which enables the conversion of NFA 256 into DFA 256, as DFA is more efficient and predictable approach for pattern matching in comparison to NFAs. In the example of FIG. 2, the DFA generator 255 outputs the DFA 256. Therefore, the DFA 256 is one of the final outputs (in addition to the symbolic map 257) of the compiler subsystem 210 that is used downstream within the STREM system 200. DFAs are typically preferred during the later stages of compilation, as they offer deterministic behavior and are easier to implement and optimize, and further provides more efficient pattern matching.

FIG. 3 illustrates an example architectural framework of the monitoring subsystem 310 for the STREM system 200. As seen in FIG. 2, the monitoring subsystem 310 receives the symbolic map 315 (an IR) which is output from the compiler subsystem (shown in FIG. 2) along with a perception data stream 316. The monitoring subsystem 310 is configured to evaluate and return the evaluations of each spatial formula against the perception data stream, for instance each frame of video data. A monitor 315 is the primary component of this subsystem 310. The monitor 315 can be structured as a compartmentalized monitor stack of at least two individual monitoring sub-components that are each designated for monitoring a subset of formulas. In an embodiment, the monitor stack of sub-components for the monitor 315 can be implemented as S4u-based formulas, for instance having a monitoring subcomponent configured as a S4u monitor, and another monitoring sub-component configured as a S4 monitor. This modular design of the monitoring subsystem 310 design provides advantage to quickly support alternative monitoring schemes and extend the capabilities of one monitor without modifying the entire monitor stack.

For example, the two separate monitoring subcomponents (an S4 and S4u) of the monitor 315 perform an evaluation of a frame against a complete $S4^+_u$ formula. During this stage, for each symbol in the symbol map (i.e., a mapping from a unique character to a valid $S4^+_u$ formula), every frame from D is evaluated and the resulting set of objects that satisfied the formula is returned creating an evaluation map 317. Thus, by leveraging these monitoring subcomponents (e.g., S4 based monitors) the monitor 315 can implement spatial logic related to topological spaces (i.e., sets) in a manner that enables searching over perception data stream 316 using pattern-based semantics with spatial components.

As a result, the monitoring subsystem 310 outputs an evaluation map 317 for further analysis within the system 200.

FIG. 4 illustrates an example architectural framework of the matching subsystem 410 for the STREM system 200. The matching subsystem 410 is configured to receive the resulting evaluation map 416 from the monitoring subsystem (shown in FIG. 3) and the previously constructed IR of a DFA 411 from the compiler system (shown in FIG. 2) as input, and finding a set of matches from the data stream. In the example of FIG. 4, a matcher 415 is the primary component of matching subsystem 410. In operation, the matcher 415 can accept the evaluation map 416 from the monitors (shown in FIG. 3) produce an augmented word, and capture matches from the word against the RE generated from the compiler subsystem (shown in FIG. 2). Consequently, the STREM system 200, as disclosed herein, has a complete framework that utilizes SpREs to query perception data streams for scenarios of interest by leveraging RE pattern matching algorithms to perform fast and efficient symbolic searching. By expressing queries using SpREs, the STREM system 200 reduces pattern matching problems to Regular Expressions, allowing for efficient and flexible querying of perception data. Furthermore, the STREM system 200 is designed for increased ease of use, to be extensible, to achieve increased effectiveness for increasingly complex scenarios.

Figure 5:
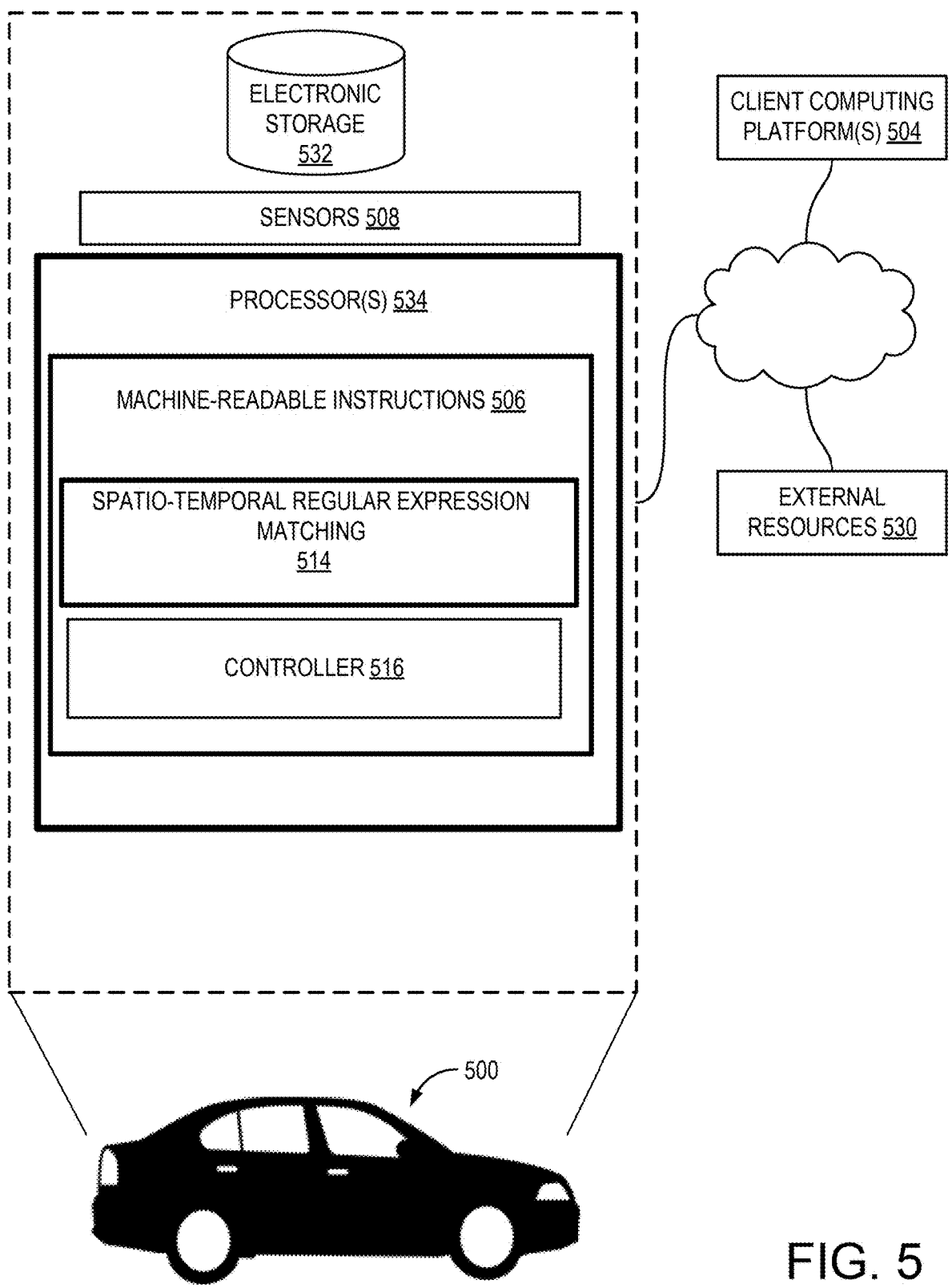
FIG. 5 depicts an example vehicle implementing the STREM system shown in FIG. 1, according to one embodiment.

FIG. 5 illustrates a vehicle 500, for instance an autonomous vehicle, configured for implementing the disclosed spatio-temporal regular expression pattern matching capabilities. In particular, FIG. 5 depicts the vehicle 500 including a STREM component 514. According to the disclose embodiments, the STREM component 514 is configured to perform spatio-temporal queries of perception data streams, where the queries are expressed as SpREs, in order to detect pattern matches within the perception data streams. In some implementations, vehicle 500 may also include sensors 508, electronic storage 532, processor(s) 534, and/or other components. Vehicle 500 may be configured to communicate with one or more client computing platforms 504 according to a client/server architecture and/or other architectures. In some implementations, users may access vehicle 500 via client computing platform(s) 504.

Sensors 508 may be configured to generate output signals conveying operational information regarding the vehicle. The operational information may include values of operational parameters of the vehicle. The operational parameters of vehicle 500 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 500 tires and roadway, distance from center of gravity of vehicle 500 to front axle, distance from center of gravity of vehicle 500 to rear axle, total mass of vehicle 500, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 500. In some implementations, at least one of sensors 508 may be a vehicle system sensor included in an engine control module (ECM) system or an electronic control module (ECM) system of vehicle 500. In some implementations, at least one of sensors 508 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 500.

In some implementations, sensors 508 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 500. In some implementations, sensors may also include sensors within nearby vehicles (e.g., communicating with the subject vehicle via V to V or other communication interface) and or infrastructure sensors (e.g., communicating with the subject vehicle via the V2I or other communication interface).

Sensors 508 may be configured to generate output signals conveying visual and/or contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.)), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far-left lane of a four-lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 508 may include virtual sensors, imaging sensors, depth sensors, cameras, and/or other sensors. As used herein, the term "camera", "sensor" and/or "image sensor" and/or "imaging device" may include any device that captures images, including but not limited to a single lens-based camera, a calibrated camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. The visual information captured by sensors 208 can be in the form of digital images and/or video that includes red, green, blue (RGB) color values representing the image. Information captured by one or more sensors may be marked, time-stamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 532, such that captured information may be stored, at least initially, in the integrated embedded storage of a particular vehicle, e.g., vehicle 500. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 500 may be configured by machine-readable instructions 506. Machine-readable instructions 506 may include one or more instruction components. The instruction components may include computer program components. The instruction components may include one or more of: a leading vehicle hazard component; a controller 516, and/or other instruction components.

As a general description, the illustrated components within the machine-readable instructions 506 include the STREM component 514. As previously described in reference to FIG. 1, the STREM component 514 is configured to perform spatio-temporal queries of perception data streams. Thus, the STREM component 514 can utilize one or more vehicle sensors 508 (e.g., camera) to capture perceptual data, such a video streams, which can be queried to perform spatial pattern matching.

Figure 6:
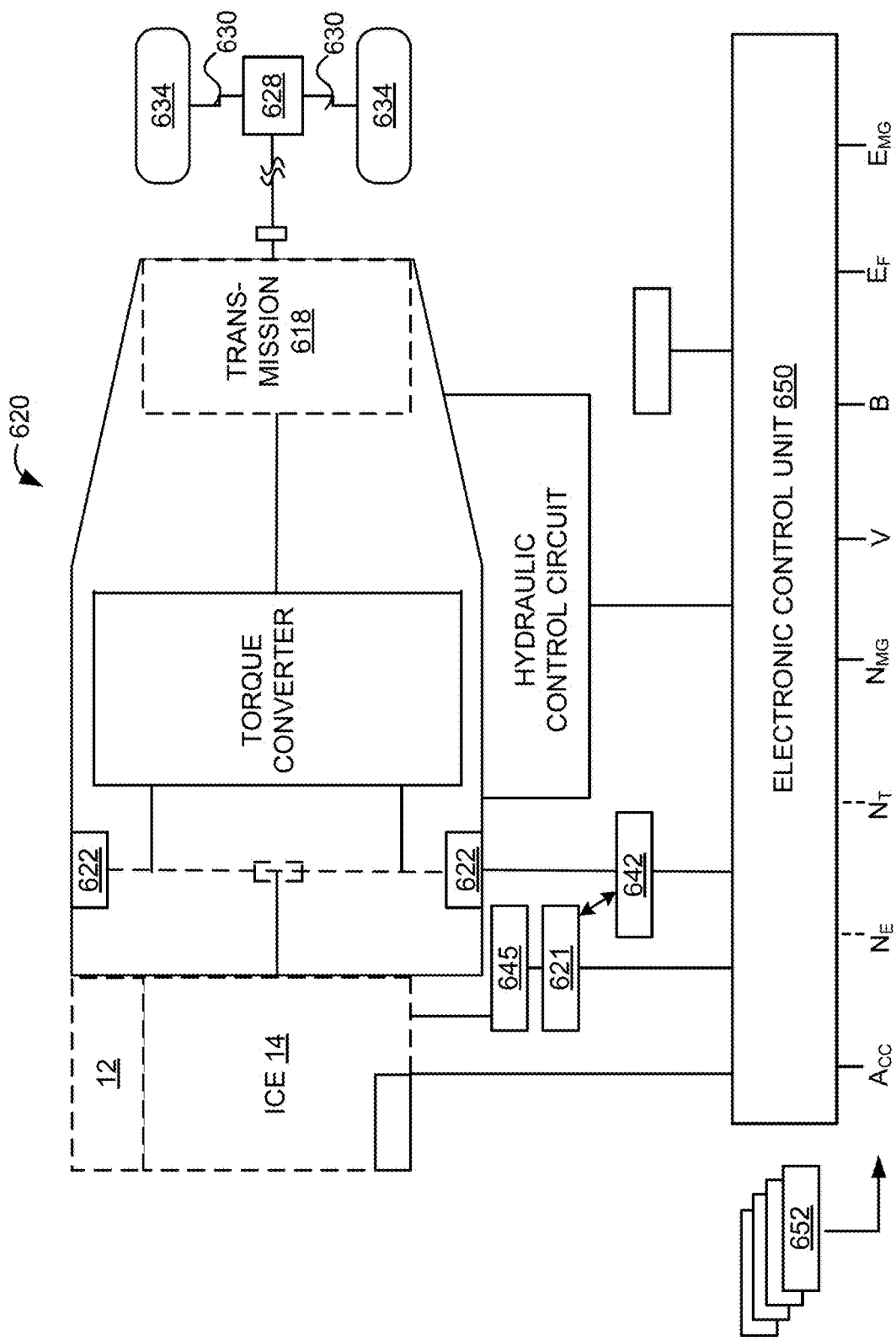
FIG. 6 depicts an example vehicle in which the systems and methods disclosed herein may be applied.

Another example vehicle in which embodiments of the disclosed technology may be implemented is illustrated in FIG. 6. The vehicle 620 may implement the autonomous vehicle and spatio-temporal regular expression matching techniques disclosed herein (as shown in FIG. 1). Additionally, the vehicle 620 can be a full electric vehicle (EV), or other type of electric-based vehicles including, fuel-cell vehicles, hybrid electric vehicles, or other vehicles.

FIG. 6 illustrates a drive system of an electric vehicle 620 that may include an EV battery 621, which stores electric powered, and one or more electric motors 622, which receive electric power from the EV battery 621, as sources of motive power. Driving force generated by the electric motors 622 can be transmitted to one or more wheels 634 via, a transmission 618, a differential gear device 628, and a pair of axles 630.

Vehicle 620 may be driven/powered with the electric motor(s) 622 as the drive source for travel. For example, a travel mode may be an EV travel mode that uses the electric motor(s) 622 as the source of motive power. Thus, in EV travel mode, vehicle 620 is powered by the motive force generated by the electric motor 622. In some implementations, another travel mode may be a hybrid electric vehicle (HEV) travel mode that uses the electric motor(s) 622 and an engine (not shown) as the sources of motive power.

As alluded to above, electric motor 622 can be used to provide motive power in vehicle 620 and is powered electrically via a battery 621 (and supplemental battery. Battery 621 may be implemented as one or more batteries or other power storage devices including, for example, lead-acid batteries, lithium ion batteries, capacitive storage devices, and so on. Battery 621 may be charged by a battery charger 645. Battery 621 may also be charged by the electric motor 622 such as, for example, by regenerative braking or by coasting during which time motor 622 operate as generator.

Electric motor 622 can be powered by battery 621 to generate a motive force to move the vehicle 620 and adjust vehicle speed. Electric motor 622 can also function as a generator to generate electrical power such as, for example, when coasting or braking. Battery 621 may also be used to power other electrical or electronic systems in the vehicle. Electric motor 622 may be connected to battery 621 via an inverter 642. Battery 621 can include, for example, one or more batteries, capacitive storage units, or other storage reservoirs suitable for storing electrical energy that can be used to power the electric motor 622. When battery 621 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 650 (described below) may be included and may control the electric drive components of the vehicle as well as other vehicle components. For example, electronic control unit 650 may control inverter 642, adjust driving current supplied to electric motor 622, and adjust the current received from electric motor 622 during regenerative coasting and braking As a more particular example, output torque of the electric motor 622 can be increased or decreased by electronic control unit 650 through the inverter 642.

As alluded to above, vehicle 620 may include an electronic control unit 650. Electronic control unit 650 may include circuitry to control various aspects of the vehicle operation. Electronic control unit 650 may include, for example, a microcomputer that includes a one or more processing units (e.g., microprocessors), memory storage (e.g., RAM, ROM, etc.), and I/O devices. The processing units of electronic control unit 650, execute instructions stored in memory to control one or more electrical systems or subsystems in the vehicle. Electronic control unit 650 can include a plurality of electronic control units such as, for example, an electronic engine control module, a powertrain control module, a transmission control module, a suspension control module, a body control module, and so on. As a further example, electronic control units can be included to control control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 6, electronic control unit 650 receives information from a plurality of sensors included in vehicle 620. For example, electronic control unit 650 may receive signals that indicate vehicle operating conditions or characteristics, or signals that can be used to derive vehicle operating conditions or characteristics. These may include, but are not limited to accelerator operation amount, ACC, a revolution speed, NE, rotational speed, NMG, of the motor 622 (motor rotational speed), and vehicle speed, NV. These may also include NT (e.g., output amps indicative of motor output), brake operation amount/pressure, B, battery SOC (i.e., the charged amount for battery 621 detected by an SOC sensor). Accordingly, vehicle 620 can include a plurality of sensors 652 that can be used to detect various conditions internal or external to the vehicle and provide sensed conditions to engine control unit 650 (which, again, may be implemented as one or a plurality of individual control circuits). In one embodiment, sensors 652 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 652 can be configured to detect, and/or sense position and orientation changes of the vehicle 620, such as, for example, based on inertial acceleration. In one or more arrangements, the electronic control unit 650 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 650 receives signals from a speedometer to determine a current speed of the vehicle 620.

In some embodiments, one or more of the sensors 652 may include their own processing capability to compute the results for additional information that can be provided to electronic control unit 650. In other embodiments, one or more sensors may be data-gathering-only sensors that provide only raw data to electronic control unit 650. In further embodiments, hybrid sensors may be included that provide a combination of raw data and processed data to electronic control unit 650. Sensors 652 may provide an analog output or a digital output. Additionally, as alluded to above, the one or more sensors 652 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 652 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 652 can be configured to acquire, and/or sense driving environment data. For example, environment sensors can be configured to detect, quantify and/or sense objects in at least a portion of the external environment of the vehicle 620 and/or information/data about such objects. Such objects can be stationary objects and/or dynamic objects. Further, the sensors can be configured to detect, measure, quantify and/or sense other things in the external environment of the vehicle 620, such as, for example, lane markers, signs, traffic lights, traffic signs, lane lines, crosswalks, curbs proximate the vehicle 620, off-road objects, etc.

Sensors 652 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 652 can be configured to acquire, and/or sense driving environment data. For example, environment sensors can be configured to detect, quantify and/or sense objects in at least a portion of the external environment of the vehicle 620 and/or information/data about such objects. Such objects can be stationary objects and/or dynamic objects. Further, the sensors can be configured to detect, measure, quantify and/or sense other things in the external environment of the vehicle 620, such as, for example, lane markers, signs, traffic lights, traffic signs, lane lines, crosswalks, curbs proximate the vehicle 620, off-road objects, etc.

Figure 7:
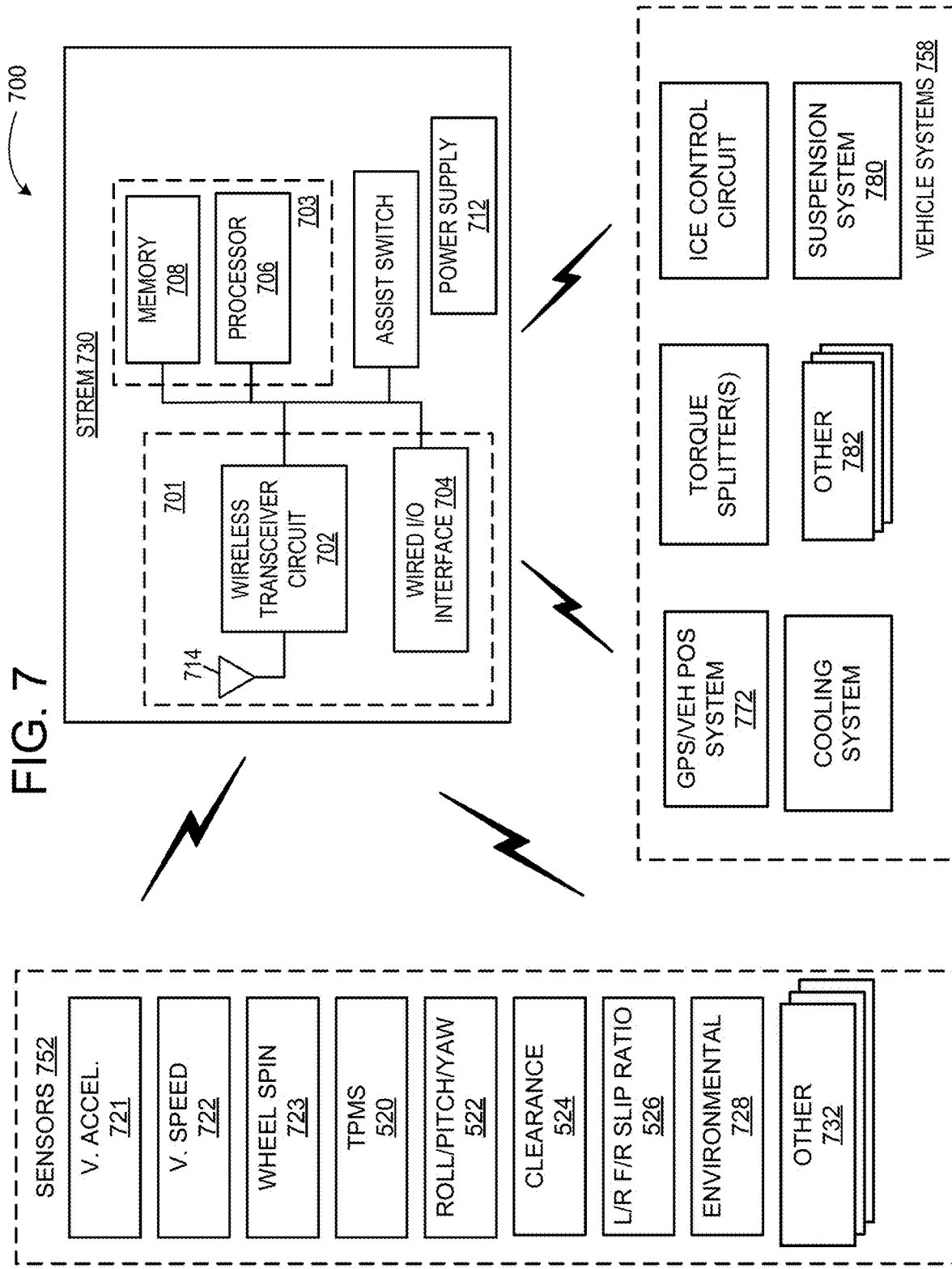
FIG. 7 depicts an example architecture of an in-vehicle STREM system, according to one embodiment.

FIG. 7 illustrates an example of a STREM controller circuit 730 implemented in a vehicle 700 in accordance with one embodiment of the systems and methods described herein. The vehicle 700 includes a STREM controller circuit 730 communicatively connected to a plurality of sensors 752, a plurality of vehicle systems 758, a database comprising roadway data, and a database comprising right-of-way rules. Sensors 752 and vehicle systems 758 wirelessly communicate with the STREM controller circuit 730. Although in this example sensors 752 and vehicle systems 758 are depicted as communicating with the STREM controller circuit 730, they can also communicate with each other as well as with other vehicle systems. The STREM controller circuit 730 can be implemented as an ECU or as part of an ECU. In other embodiments, the STREM controller circuit 730 can be implemented independently of the ECU.

The STREM controller circuit 730 in this example includes a communication circuit 701, a controller/CPU 703, and a power supply 712. The controller/CPU 703 includes a processor 706 and memory 708. For example, the processor 706, and the memory 708 are configured for performing spatial analysis, analysis of perception data streams, and spatio-temporal queries of perception data streams to detect pattern matches within the perception data streams.

Processor 706 can include one or more GPUs, CPUs, microprocessors, or any other suitable processing system. Processor 706 may include a single core or multicore processors. The memory 708 may include one or more various forms of memory or data storage (e.g., flash, RAM, etc.) that may be used to store instructions and variables for processor 706 as well as any other suitable information, such as, one or more of the following elements: rules data; resource data; GPS data; and base data, as described below. Memory 708 can be made up of one or more modules of one or more different types of memory, and may be configured to store data and other information as well as operational instructions that may be used by the processor 706.

Although the example of FIG. 7 is illustrated using processor and memory circuitry, as described below with reference to circuits disclosed herein, controller/CPU 703 can be implemented utilizing any form of circuitry including, for example, hardware, software, or a combination thereof. By way of further example, one or more processors, controllers, ASICs, PLAS, PALs, CPLDs, FPGAS, logical components, software routines or other mechanisms might be implemented to make up the STREM controller circuit 730. Communication circuit 701 includes either or both a wireless transceiver circuit 702 with an associated antenna 714 and a wired I/O interface 704 with an associated hardwired data port (not illustrated). Communication circuit 701 can provide for V2X communications capabilities, allowing the STREM controller circuit 730 to communicate with edge devices, such as roadside equipment (RSE), network cloud servers and cloud-based databases, and/or other vehicles.

As this example illustrates, communications with the STREM controller circuit 730 can include either or both wired and wireless communications circuits 701. Wireless transceiver circuit 702 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 714 is coupled to wireless transceiver circuit 702 and is used by wireless transceiver circuit 702 to transmit radio signals wirelessly to wireless equipment with which it is connected and to receive radio signals as well. These RF signals can include information of almost any sort that is sent or received by the STREM controller circuit 730 to/from other entities such as sensors 752 and vehicle systems 758.

Power supply 712 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In the illustrated example, sensors 752 include vehicle acceleration sensors 721, vehicle speed sensors 722, wheel-spin sensors 723 (e.g., one for each wheel), environmental sensors 728 (e.g., to detect salinity or other environmental conditions), proximity sensor (e.g., sonar, radar, lidar or other vehicle proximity sensors), TPMS sensors 520, roll/pitch/yaw sensors 522, Clearance sensors 524, L/R F/R slip ratio sensors 526, and image sensors.

Additional sensors (i.e., other sensors 732) can be included as may be appropriate for a given implementation of vehicle 700.

The sensors 752 include front facing image sensors, side facing image sensors, and/or rear facing image sensors. Image sensors may capture information which may be used in detecting not only vehicle conditions but also detecting conditions external to the vehicle 700 as well. Image sensors that might be used to detect external conditions can include, for example, cameras or other image sensors configured to capture data in the form of sequential image frames forming a video in the visible spectrum, near infra-red (IR) spectrum, IR spectrum, ultraviolet spectrum, etc. Image sensors can be used to, for example, to detect objects in an environment surrounding vehicle 700, for example, traffic signs indicating a current speed limit, road curvature, obstacles, surrounding vehicles, and so on. For example, one or more image sensors may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors may include cameras that may be used with and/or integrated with other proximity sensors such as LIDAR sensors or any other sensors capable of capturing a distance. As used herein, a sensor set of a vehicle may refer to sensors 752 and image sensors as a set.

Vehicle systems 758 include any of a number of different vehicle components or subsystems used to control or monitor various aspects of the vehicle and its performance. In this example, the vehicle systems 758 includes a vehicle positioning system 772; vehicle audio system comprising one or more speakers configured to deliver audio throughout the vehicle; object detection system to perform image processing such as object recognition and detection on images from the image sensors, proximity estimation, for example, from the image sensors and/or proximity sensors, etc. for use in other vehicle systems; suspension system 780 such as, for example, an adjustable-height air suspension system, or an adjustable-damping suspension system; and other vehicle systems 782 (e.g., Advanced Driver-Assistance Systems (ADAS), such as forward/rear collision detection and warning systems, pedestrian detection systems, autonomous or semi-autonomous driving systems, and the like).

The vehicle positioning system 772 includes a global positioning system (GPS). Vehicle 700 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a location (e.g., an area of defined space surrounding a geographic location or geographic position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Network 790 may be a conventional type of network, wired or wireless, and may have numerous different configurations including a star configuration, token ring configuration, or other configurations. Furthermore, the network 790 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 790 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VOLTE, 5G-V2X or any other mobile data network or combination of mobile data networks. Further, the network 390 may include one or more IEEE 802.11 wireless networks.

In one embodiment, data comprising the location of vehicle is captured by the vehicle position system 772. The vehicle position system 772 can include one or more sensors 752 configured to capture vehicle position data. The vehicle positioning system 772 communicates with the STREM controller circuit 730 to communicate and utilize knowledge at the vehicle 700 for various driving and/or maneuvering functions, including autonomous or semi-autonomous vehicle/driver safety features.

In an embodiment, the STREM controller circuit 730 produces notifications for the driver of the vehicle 700 using one or more notification methods. For example, the driver may receive a visual and/or audible notification that they are approaching an identified risky zone, based on STREM controller circuit 730 has received in accordance with knowledge networking capabilities, as disclosed herein. In one embodiment, the notification methods include the vehicle systems 758 comprising the vehicle audio system and the vehicle dashboard system. The notification methods includes visual and/or audible methods of informing the driver of safety related issues. In one embodiment, the notification methods include notifying the driver of the vehicle 700 via one or more vehicle systems 758. For example, in one embodiment, the driver is notified of riskiness of a driving environment via the vehicle audio system (e.g., instructions played/broadcasted over one or more vehicle speakers), the vehicle display system 780 and/or the vehicle dashboard system. In one embodiment, the driver is notified of safety issues by a navigation system within the instrument cluster and the dashboard GUI. The notification can include visual instructions (e.g., visual directions on how to proceed), and/or auditory instructions (e.g., verbal commands from the STREM controller circuit 730 to the driver).

Figure 8:
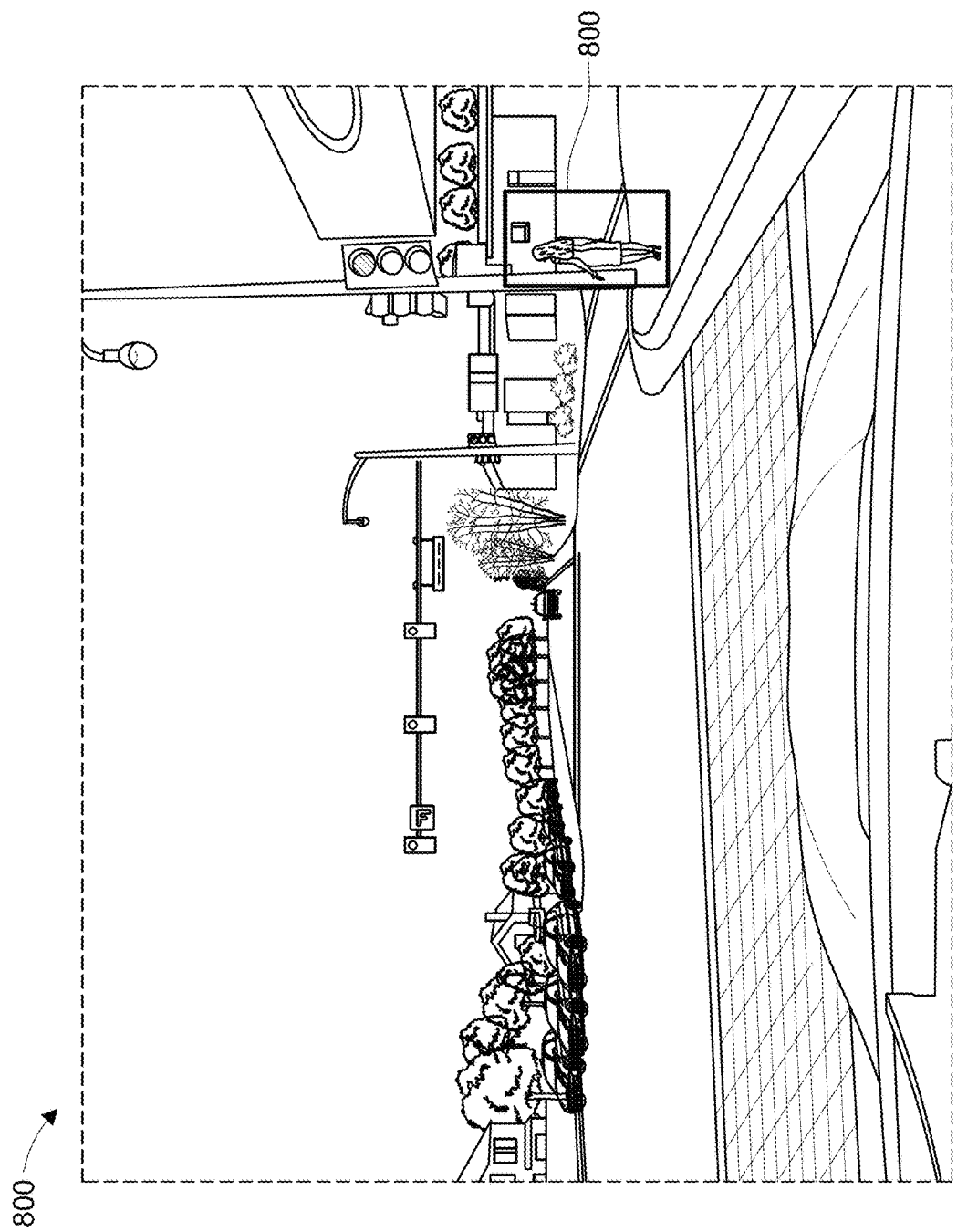
FIG. 8 depicts an example of a result generated by the STREM system shown in FIG. 1 in response to executing a spatio-temporal query, according to one embodiment.

FIG. 8 displays an example of a STREM result 800, shown as a frame of a video stream, which is a result generated by the STREM system in response to a spatio-temporal query. A main feature is of the disclosed STREM system, as described herein, is receiving a video data stream and a query in SpRE, return a set of frames that match the provided query. In some embodiments, the STREM system can return a set of objects in each frame matching the spatio-temporal query (in lieu of, or in addition to returning the set of frames).In other words, the STREM system can provide a binary application presented as a CLI tool with various options and arguments to effectively perform pattern matching against video data streams of perception datasets. In an example usage, a user can provide two arguments: a query and a data stream, and the STREM system can generate a set of frames indices, if any, as the results that are returned. In the example of FIG. 8, the STREM result 800 is generated by querying the regular expression [*pedestrian*] in video stream of an autonomous vehicle. As seen, a bounding box 801 surrounds the pedestrian that is present in the video data stream, matching the object "pedestrian" that was searched.

Figure 9:
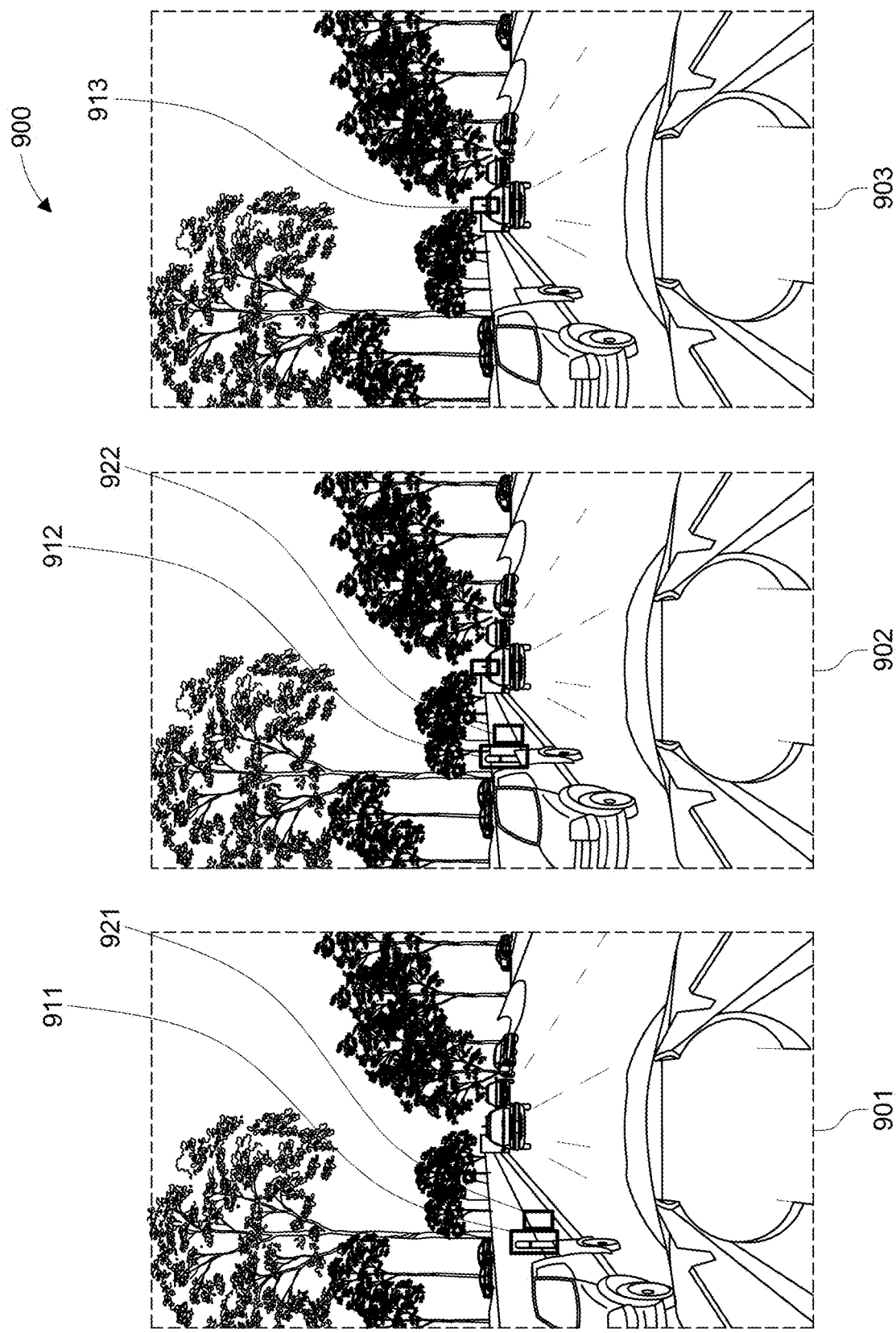
FIG. 9 depicts another example of a result generated by the STREM system shown in FIG. 1 in response to executing a spatio-temporal query, according to one embodiment.
Figure 10:
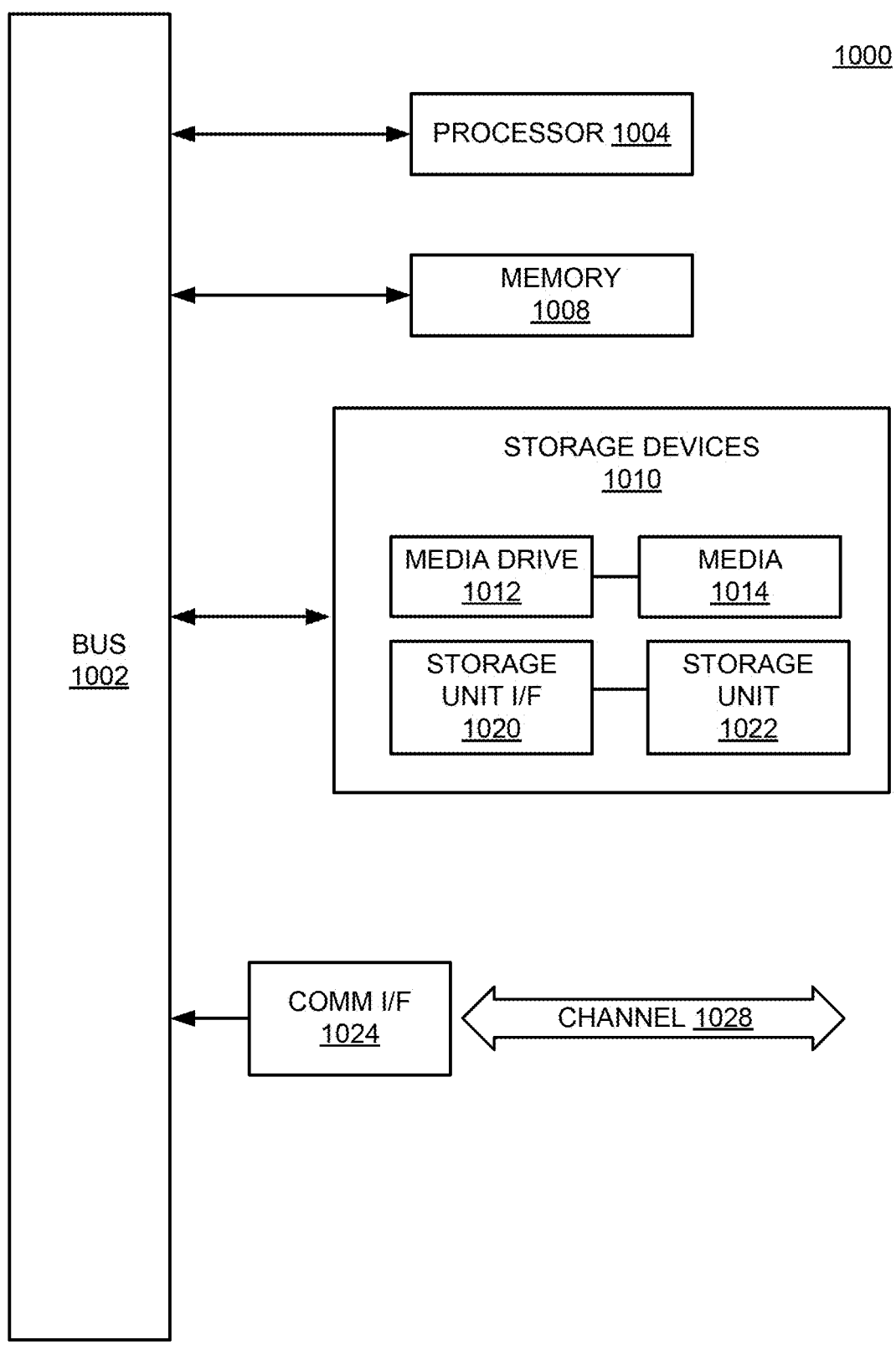
FIG. 10 is an example computing component that may be used to implement various features of embodiments described in the present disclosure.

FIG. 9 displays an example of a STREM result 900, shown as multiple frames 901-903 of a video stream, which is a result generated by the STREM system in response to a spatio-temporal query. In the example of FIG. 9, the STREM result 900 is generated from querying the regular expression ([[:animal:]& [:pedestrian:]]{2}[[:car:]|[:bicycle:]]) in a video data stream of an autonomous vehicle. As seen, an animal and a pedestrian appear in frames 901 and 902 indicated by bounding boxes 911 and 912 (in frame 901) and bounding boxes 912 and 922 (in frame 902), and a frame 903 where a car or a bicycle appears indicated by bonding box 913.

Where components are implemented in whole or in part using software, these software elements can be implemented to operate with a computing or processing component capable of carrying out the functionality described with respect thereto. One such example computing component is shown in FIG. 10. Various embodiments are described in terms of this example computing component 1000. After reading this description, it will become apparent to a person skilled in the relevant art how to implement the application using other computing components or architectures.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and the storage unit interface 1020. Examples of such storage units 1022 and storage unit interfaces 1020 can include a program cartridge and cartridge interface, a removable memory (for example, a flash memory or other removable memory component) and memory slot. Other examples may include a PCMCIA slot and card, and other fixed or removable storage units 1022 and storage unit interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit interface 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
receiving a command associated with a spatio-temporal query, wherein the spatio-temporal query comprises spatial regular expressions (SpREs) comprising a pattern-based semantic component and a spatial component; and
performing the spatio-temporal query of a plurality of perception data streams using the SpREs, wherein the spatial component of the SpREs describe spatio-temporal patterns between objects to be searched within the plurality of perception data streams.

2. The method of claim 1, further comprising converting the SpREs into an equivalent Deterministic Finite Automata (DFA).

3. The method of claim 2, further comprising generating a corresponding symbolic map to map topological events to symbols in a regular expression (RE).

4. The method of claim 1, further comprising determining whether there is a match of the spatio-temporal patterns within the plurality of perception data streams; and
returning a set of matches comprising each determined match as a result of the spatio-temporal query.

5. The method of claim 1, further comprising receiving the plurality of perception data streams from one or more vehicles comprising sensors.

6. The method of claim 5, wherein the spatio-temporal query comprises searching an offline database storing the plurality of perception data streams.

7. The method of claim 6, wherein the spatio-temporal query returns a set of frames matching the spatio-temporal query or a set of objects in each frame matching the spatio-temporal query.

8. The method of claim 5, wherein the plurality of perception data streams comprises at least one of video data stream, lidar data stream, sonar data stream, and radar data stream.

9. The method of claim 5, wherein the one or more vehicles comprise: an autonomous vehicle, a semi-autonomous vehicle, an automated driving system, or a non-autonomous vehicle.

10. The method of claim 1, wherein the spatio-temporal query comprises searching the plurality of perception data streams from an online streaming source.

11. The method of claim 10, wherein the online streaming source comprises one or more of: an autonomous vehicle, a robotic device, an unmanned ariel vehicle, and an advanced driver assistance system (ADAS).

12. The method of claim 1, further comprising performing an action associated with an automotive application based on the spatio-temporal query.

13. The method of claim 12, wherein the automotive application comprises one or more of: executing control of an autonomous vehicle, determining scenarios of interest from searching an offline database storing the plurality of perception data streams from vehicles, executing testing of autonomous vehicle software in simulation or in a real-world deployment, and executing diagnostics of autonomous vehicle perception systems.

14. A vehicle comprising:
sensors capturing a plurality of perception data, wherein the plurality of perception data is associated with a driving environment of the vehicle; and
a controller performing spatio-temporal queries of the plurality of perception data to determine a presence of a spatio-temporal pattern between objects within the driving environment of the vehicle, wherein the spatio-temporal queries comprise a pattern-based semantic component and a spatial component and executes spatio-temporal searches within the plurality of perception data and returns instances of perception data matching the spatio-temporal pattern between the objects, and executing an autonomous control of the vehicle based on the spatio-temporal query of the searched pattern, wherein the autonomous control is associated with the driving environment.

15. The vehicle of claim 14, wherein the spatio-temporal queries comprise spatial regular expressions (SpREs).

16. The vehicle of claim 15, wherein the controller receives additional perception data from a database storing the additional perception data.

17. The vehicle of claim 16, wherein the additional perception data is collected by a plurality of vehicles having sensor capabilities.

18. The vehicle of claim 16, wherein the controller performs spatio-temporal queries of the additional perception data to detect scenarios to test autonomous vehicle functions of the vehicle.

19. The vehicle of claim 14, wherein the vehicle comprises an autonomous vehicle.

20. A computer system, comprising:
one or more processors; and
a memory having instructions stored thereon, which when executed by the one or more processors cause the processors to perform:
receiving a command associated with a spatio-temporal query, wherein the spatio-temporal query comprises spatial regular expressions (SpREs), wherein the SpREs comprise a pattern-based semantic component and a spatial component; and
performing the spatio-temporal query of a plurality of perception data streams using the SpREs, wherein the SpREs describe spatio-temporal patterns between objects to be searched within the plurality of perception data streams.

* * * * *